United States Patent [19]

Arnold

[11] Patent Number: 5,009,135

[45] Date of Patent: Apr. 23, 1991

[54] BRAKE ADJUSTMENT TOOL

[75] Inventor: Lawrence J. Arnold, Eagle Harbor, N.Y.

[73] Assignee: Edward Arnold, Hilton, N.Y.

[21] Appl. No.: 412,515

[22] Filed: Sep. 26, 1989

[51] Int. Cl.5 ............................................. B25B 9/00
[52] U.S. Cl. ....................................... 81/488; 81/303
[58] Field of Search ................ 81/488, 484, 303, 304, 81/308; 29/244, 246, 268, 267; 188/196 R, 196 M

[56] References Cited

U.S. PATENT DOCUMENTS

| 2,363,350 | 11/1944 | Nail | 29/246 |
| 2,375,081 | 5/1945 | Colley | 29/246 |
| 4,787,139 | 11/1988 | Sweet | 29/246 |

Primary Examiner—Roscoe V. Parker

[57] ABSTRACT

A tool and method of using the tool are provided for use in making brake backlash adjustments in heavy duty vehicles. The tool is specially designed to overcome a problem of locking collars for brake adjusting screws becoming stuck in retracted positions. The tool features an adjustable clamp, a pivot support, and a lever arm which cooperate to restore locking collars to their original positions.

26 Claims, 3 Drawing Sheets

BRAKE ADJUSTMENT TOOL

FIELD OF INVENTION

The invention relates to the field of brake mechanisms, and more particularly to tools for adjusting brake mechanisms of the type used in heavy duty vehicles such as trucks, trailers, and buses.

BACKGROUND

Brake mechanisms used in heavy duty automotive applications are generally of the pneumatic type in which air pressure is used to apply the vehicle's brakes. Typically, such brake mechanisms include a drum which rotates concentrically with a wheel to be braked and a brake shoe carried by the frame of the vehicle that may be frictionally engaged with an interior wall of the drum by air pressure.

The brake shoe is moved into and out of engagement with the drum about a crankshaft that is mounted on the vehicle frame for rotation about its axis. The crankshaft is turned about its axis by a slack adjuster that is connected to a pneumatic actuator. The slack adjuster includes an interiorly splined adjustment ring at one end for receiving the crankshaft and is attached at its other end to the pneumatic actuator. Together, the crankshaft and slack adjuster form a lever arm acting about the rotational axis of the crankshaft for pivoting the brake shoe into and out of engagement with the drum in response to movement of the pneumatic actuator.

Typically, the pneumatic actuator includes a cylinder mounted on the vehicle frame and a piston having a limited range of travel within the cylinder. The piston includes an arm that is connected to the slack adjuster. In accordance with the known operation of such actuators, pressurized air introduced into the cylinder moves the piston within the cylinder and, through the piston's connection to the slack adjuster, also moves the brake shoe into engagement with the drum. However, when the pressurized air is released from the cylinder, a spring biases the brake shoe away from the drum and returns the piston to its initial or "resting" position within the cylinder.

When the brake shoe is so biased away from the drum, a small clearance space is defined between the shoe and drum which permits the associated wheel to rotate freely. The amount of clearance space, also referred to as backlash, must be maintained within a specific tolerance to insure proper operation of the brakes. For example, if not enough backlash is present, the brake shoe may continuously drag against the drum leading to a buildup of heat and premature wear of the contacting parts. Alternatively, if too much backlash is present, the distance through which the piston must travel prior to the brake shoe making contact with the drum increases; and this may undesirably delay braking response of the vehicle. Variations in the amount of backlash between different wheels may also result in uneven braking responses of the wheels and thereby destabilize the vehicle during braking.

Accordingly, it is of well-recognized importance to maintain backlash between the brake shoe and drum within a specified tolerance. However, during the course of ordinary vehicle use, the brake shoe and drum tend to wear, thereby increasing the amount of backlash between them. In contrast, if a worn brake shoe is replaced with a new one, backlash may be decreased. Thus, periodic adjustments to the amount of backlash between the brake shoe and drum are required to maintain the brakes in good working order.

The slack adjuster includes an adjusting screw for this purpose. The adjusting screw includes a shaped head portion at one end which extends out of the slack adjuster and a threaded portion at its other end that engages the outer surface of the adjustment ring which receives the crank shaft. When the screw is turned, the crank shaft is rotated, thereby moving the brake shoe toward or away from the drum. Backlash may be set by turning the adjusting screw in an appropriate direction until the amount of clearance space between the brake shoe and drum is within a specified tolerance.

The shaped head portion of the adjusting screw is protected by a retractable collar which is slidably mounted in a chamber formed in the outer surface of the slack adjuster. The locking collar is spring loaded within the chamber to urge the locking collar into engagement with the shaped head portion of the adjusting screw, thereby capturing the head portion of the screw within the collar. A keyway is provided within the slack adjuster chamber to receive a key portion of the collar to prevent the collar and the captured head portion of the adjusting screw from turning. However, when an adjustment is to be made to backlash, the locking collar may be retracted against the spring within its chamber to fully expose the head portion of the adjusting screw. A wrench may be used on the exposed head portion of the adjusting screw to turn the screw to a desired backlash setting. Following removal of the wrench, the locking collar is allowed to return to its original position to prevent any further turning of the screw.

However, even after relatively short periods of vehicle use, rust begins to form on the locking collar and in the chamber within which it is mounted. This condition is often aggravated by road salts and acids used for cleaning trucks. As a result, the locking collar is no longer easily slidable within its chamber. When this happens, it is a common practice to retract the locking collar by pounding it with a hammer to expose the adjusting screw. Although this practice is generally effective for retracting the locking collar, a more serious problem may follow with the locking collar becoming stuck in its retracted position. However, common practices for freeing locking collars stuck in retracted positions, such as pounding on the collar with chisels or attempting to grab the locking collar with vise grips, are often not very effective for freeing the collar and may permanently damage the collar.

Unless the locking collar can be returned to its original position protecting the adjusting screw, the entire slack adjuster must be replaced at a cost of considerable time and expense. Further, if it is necessary to make an emergency brake adjustment where replacement parts are not available and the locking collar becomes permanently stuck in a retracted position, it is possible that the vehicle will be driven without the protective benefits of the locking collar guarding against loosening of the adjusting screw. If the adjusting screw is left unguarded for even a relatively short period of time, vibrations associated with normal brake use may result in a loss of proper braking at the affected wheel.

SUMMARY OF INVENTION

The present invention overcomes the above-described problems relating to brake locking collars becoming stuck in retracted positions. The solution proposed by the present invention involves a hand tool of novel construction and a novel method of using a tool for freeing retracted locking collars in the course of making backlash adjustments.

The novel locking collar restoring tool includes an adjustable clamp having opposing jaw portions for gripping a peripheral surface of the locking collar. Each of the opposing jaw portions may include a projecting edge formed adjacent to a bottom surface of the clamp for contacting the peripheral surface of the collar and for forming a load bearing surface against an end rim (or lip) of the collar. Suitable means are also provided for adjusting spacing between the jaw portions of the clamp for gripping or releasing the locking collar.

A pivot support may be mounted on a top surface of the clamp for supporting a detachable lever arm about a pivot axis. The lever arm includes a handle formed at one end and a cam extension that is located along the lever arm in a position which may be pivoted into contact with the head portion of an adjusting screw. The lever arm may be mounted about the pivot axis in either one of two positions. In one of these positions, the cam extension is located between the handle and the pivot axis. In the other position, the pivot axis lies between the handle and the cam extension.

It is also contemplated that a second handle may be attached directly to the adjustable clamp. For example, the second handle may be attached to both jaw portions of the adjustable clamp in a manner which biases the two opposing jaw portions apart. The clamp adjusting means overcomes this bias for tightening the jaw portions against the peripheral surface of the locking collar. Alternatively, the second handle may be made detachable from the adjustable clamp to accommodate a more limited space for using the tool.

The novel tool also includes a number of other features for providing sufficient clearance for using the tool. For example, one or more clearance spaces may be defined between the projecting edges of the jaw portions to provide clearance for the key portion of the locking collar. Preferably, four equally spaced clearance openings are defined in or between the projecting edges to permit the tool to be oriented in any one of four quadrants about the locking collar. This feature enables the tool to be used in the most appropriate orientation for avoiding interference with other elements of the brake mechanism or vehicle body.

Another clearance space is formed in the top surface of the adjustable clamp within the opposing jaw portions to permit access to the end rim of the locking collar and the head portion of the adjusting screw. This feature, along with provision for removing the detachable lever arm, enables the locking collar to be forcefully retracted with the adjustable clamp already in place for gripping the collar beneath its rim.

The present invention also includes a novel method for adjusting backlash of brake mechanisms in which there is a risk that the locking collar may become stuck in a retracted position. The novel method includes mounting the adjustable clamp about the peripheral surface of the locking collar so that the projecting edges of the jaw portions fit beneath the end rim of the collar. The collar is then retracted by usual means operating within the clearance space between jaw portions, and a backlash adjustment is made.

Following the adjustment, the lever arm is positioned about the pivot support so that the cam extension contacts the head portion of the adjusting screw. A force is then applied to the handle of the lever arm in a direction which produces a drawing force on the locking collar between the cam extension of the lever arm and the projecting edges of the adjustable clamp. The drawing force may be augmented by also applying a similar force to a second handle attached directly to the clamp. For example, the two handles may be squeezed together by hand to effect a considerable drawing force on the locking collar for restoring the collar to its original position.

In general, the present invention provides a direct and cost effective solution to the problem of brake locking collars becoming stuck in retracted positions. The hand tool of the present invention is regarded as being an important addition to brake mechanics' tool collections for making brake adjustments much easier and more reliable. The tool may also be important to truck drivers who must make emergency brake adjustments in remote locations away from service areas.

Further, the tool is expected to be readily manufacturable at low cost. In fact, the cost of replacing a single slack adjuster with a damaged locking collar is expected to exceed the cost of the tool. Considering also that the tool and method of the present invention provide for restoring locking collars to perform their important function of guarding against inadvertent brake adjustment, a significant safety benefit may be realized with the present invention, especially in situations where replacement slack adjusters are not immediately available.

These and other features and advantages of the present invention will become more apparent in a detailed description of the present invention which refers to the following drawing figures.

DRAWINGS

DETAILED DESCRIPTION

Figure 1:
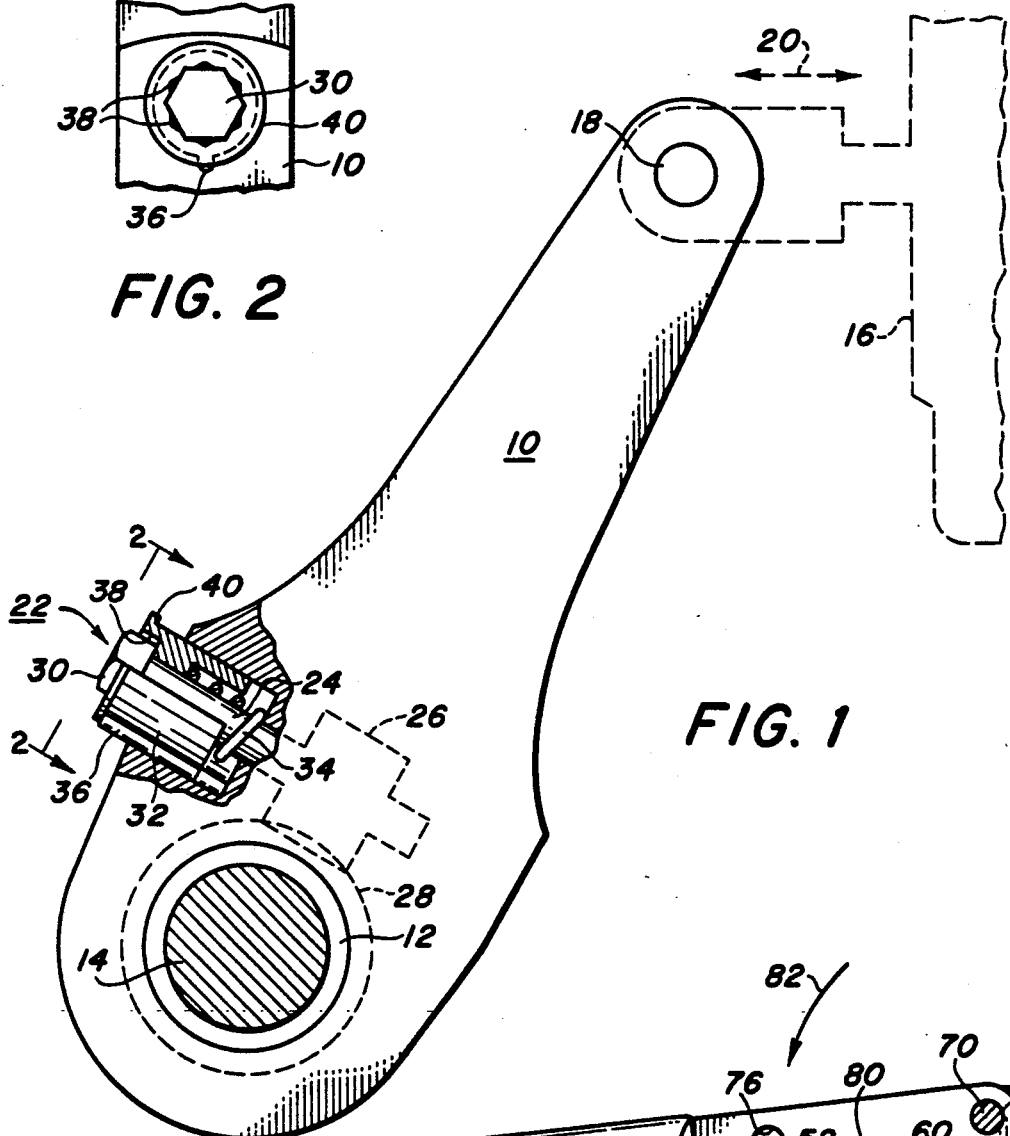
FIG. 1 is a side elevational view of a known slack adjuster with a partly cut-away view showing a locking collar and a schematic outline of a known pneumatic actuator.

Referring to FIG. 1, a known slack adjuster 10 of a heavy duty brake mechanism is illustrated. A brake actuator 16, depicted schematically in dashed line, is connected to one end of slack adjuster 10 by pin 18. The other end of slack adjuster 10 includes an adjustment ring 12 within which crank shaft 14 is rotatively fixed.

In accordance with the known operation of the just-described mechanism, movements of brake actuator 16 in the directions of arrows 20 turn crank shaft 14 for applying or releasing a brake (not shown).

Slack adjuster 10 also includes a backlash adjustment mechanism 22 which is illustrated in a partly cut-away view of FIG. 1. The adjustment mechanism 22 includes an adjusting screw 24 having a shaped head portion 30 which extends out of the slack adjuster and a threaded portion 26 (shown schematically in dashed line) which is captured within a pocket formed in the slack adjuster. Threaded portion 26 engages a mating toothed portion 28 of adjustment ring 12 so that when adjusting screw 24 is turned, adjustment ring 12 together with crank shaft 14 are also turned for adjusting brake backlash.

Figure 2:
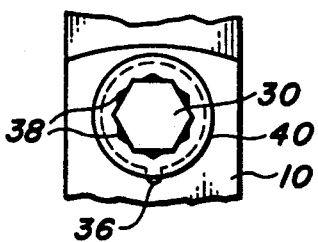
FIG. 2 is a view of the locking collar portion of the slack adjuster shown in FIG. 1 taken along line 2—2.

Brake adjustment mechanism 22 also includes a locking collar 32 (shown partly in cross section in FIG. 1) for preventing inadvertent movements of adjusting screw 24. A spring 34 lifts locking collar 32 within a chamber formed in slack adjuster 10 into protective engagement with shaped head portion 30 of adjusting screw 24. A key 36, formed along the length of locking collar 32, is guided along a keyway formed in the slack adjuster chamber to permit movement of locking collar 32 depthwise of the chamber while preventing any rotation of the locking collar within the chamber. A shaped pocket 38 (see also FIG. 2) is formed in one end of locking collar 32 for capturing similarly shaped head portion 30 and for preventing the adjusting screw from turning with respect to the locking collar. This well-known arrangement of the locking collar effectively guards against any loosening of the adjusting screw with respect to the slack adjuster during vehicle use.

Accordingly, prior to making an adjustment to backlash, locking collar 32 must be retracted against spring 34 to fully expose head portion 30 of the adjusting screw. Typically, a socket wrench is used to turn the adjusting screw. This is done with the air pressure turned off. The adjusting screw is first turned until the brake shoe tightly engages the drum, and then the screw is backed off approximately one-half turn. Once the adjustment has been made, it is intended for spring 34 to restore locking collar 32 to its original position guarding the head portion of the adjusting screw.

In practice, however, locking collar 32 and slack adjuster 10 tend to rust together resulting in the locking collar becoming seized within its chamber. Although it is usually possible to forcefully retract the locking collar, such forceful retraction has often resulted in the locking collar becoming permanently stuck in a retracted position.

FIGS. 3 through 7 illustrate one embodiment of the novel tool of the present invention for restoring locking collars to their original positions. The novel tool features an adjustable clamp 42, a pivot support 62, and a lever arm 72 (best shown in FIGS. 5 through 7) which cooperate to provide a mechanical advantage for restoring retracted locking collars.

Adjustable clamp 42 includes opposing jaw portions 44 and 46 which may be adjustably connected to each other by screws 50. Respective head portions of screws 50 bear against an outer surface of jaw portion 46, and respective threaded portions are received in similarly threaded bores (see FIG. 4) formed in jaw portion 44. Opposing jaw portions 44 and 46 may be either moved together or allowed to separate by turning screws 50 in an appropriate direction.

A clearance opening 52 is formed in a top surface 54 of the adjustable clamp between opposing jaw portions 44 and 46. Each jaw portion includes one or more projecting edges 56 which are formed adjacent to the bottom surface 58 of the adjustable clamp within clearance opening 52.

Figure 3:
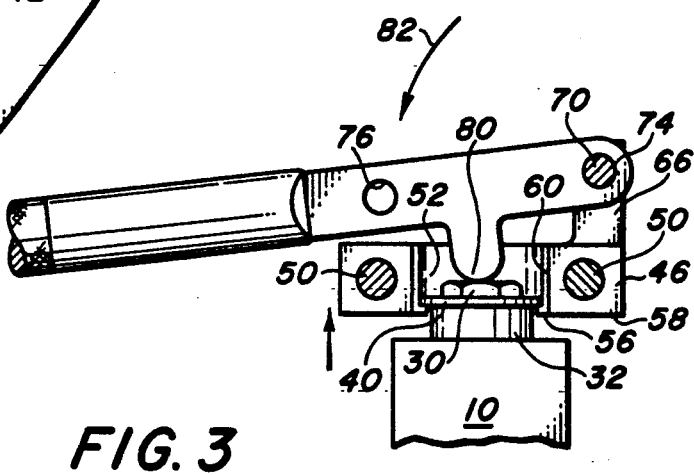
FIG. 3 is a side elevational view of the novel tool of the present invention mounted about a locking collar with one of the opposing jaw portions of the tool removed.
Figure 4:
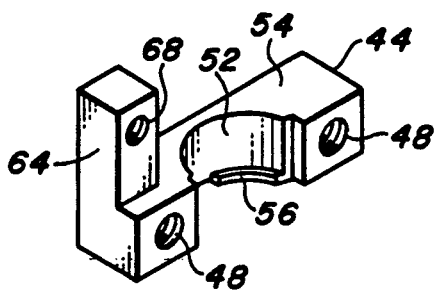
FIG. 4 is a perspective view of one of the jaw portions of the novel tool also showing a portion of the pivot support.

With reference to FIG. 3, it can be seen that clearance opening 52 is sized in diameter to permit access to end rim 40 of locking collar 32 through top surface 54 of the adjustable clamp. Thus, even with the adjustable clamp in place gripping the locking collar, it would be possible to forcefully retract the locking collar by usual means. Further, projecting edges 56 are sized in diameter to form a load bearing surface against end rim 40 within clearance opening 52 while occupying only a small portion of the intended travel distance of locking collar 32 against spring 34. In other words, even with the adjustable clamp in place, it would also be possible to retract the locking collar a sufficient distance to fully expose shaped head portion 30 of the adjusting screw.

Figures 5, 6, 7:
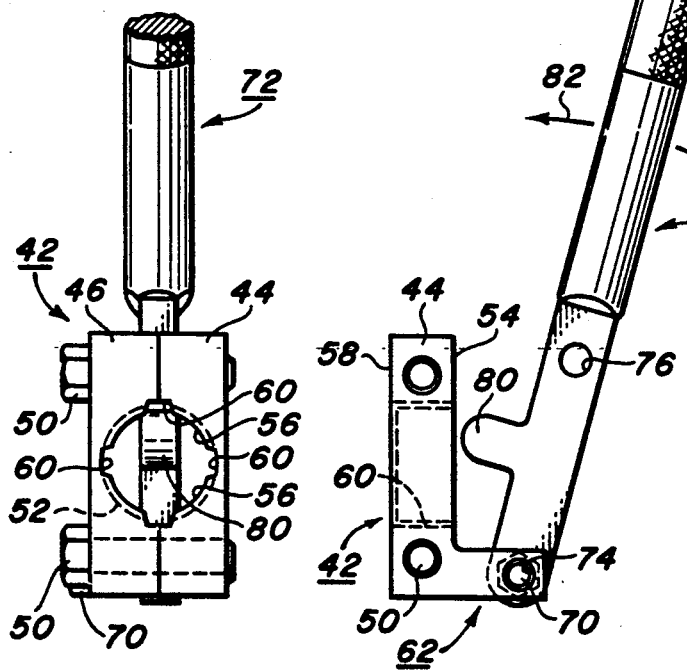
FIG. 5 is a bottom elevational view of the novel tool.
FIG. 6 is another side elevational view of the novel tool.
FIG. 7 is a top elevational view of the same tool shown in FIGS. 5 and 6.

It may be noted, particularly with reference to FIG. 5, that projecting edges 56 may define four equally spaced clearance openings 60 in bottom surface 58 of the adjustable clamp. Openings 60 are sized to provide clearance for key 36 of locking collar 32 so that the adjustable clamp can be mounted about the locking collar in any one of four different orientations with respect to key 36.

The novel tool also includes pivot support 62 defined by parallel columns 64 and 66 which may be formed integrally with respective jaw portions 44 and 46 on top surface 54 of the adjustable clamp. A removable pivot screw 70 may be threadably mounted across the columns 64 and 66 forming a pivot axis between them. In particular, pivot screw 70 is held in place by a threaded engagement with bore 68 (see FIG. 3) of column 64.

Lever arm 72 may also include a pair of bearing surfaces 74 and 76 for pivotally mounting the lever arm in either of two positions about pivot screw 70. In the embodiment illustrated, bearing surface 74 is used for mounting the lever arm. A handle 78 is formed at one end of the lever arm to provide for manually pivoting the lever arm about pivot screw 70. A cam extension 80 is formed along the length of the lever arm midway between bearing surfaces 74 and 76 for contacting head portion 30 of adjusting screw 24.

Movements of lever arm 72 in the angular directions of arrows 82 and 84 may be understood to define a pivot axis which extends coincident with pivot screw 70. Also, projecting edges 56 adjacent to bottom surface 58 of the adjustable clamp may be understood to define a clamping plane (i.e., the plane of FIG. 5) within which the adjustable clamp grips the locking collar. Pivot screw 70 and its associate pivot axis are oriented substantially parallel to the clamping plane so that movement of lever arm 72 also moves cam extension 80 either toward or away from the clamping plane.

The novel tool design also involves a resolution of a number of proportional considerations regarding the above-identified components. For example, it is considered important that cam extension 80 is located at a sufficient distance from either bearing surface 74 or 76 to provide for an amount of travel perpendicular to the clamping plane at least equal to the travel of the locking collar between retracted and original positions. Further, it is also considered important that cam extension 80 projects a sufficient distance from the lever arm in the direction of the clamping plane so that the cam extension remains in contact with the head portion of the adjusting screw within opening 52 throughout the travel distance of the locking collar (and adjustable clamp) between its retracted and original positions.

In addition, although the pivot axis coincident with pivot screw 70 has been illustrated in a single position with respect to the clamping plane, it may be appreciated that other positions of the pivot axis are also possible. In this regard, it is preferred that the distance of the pivot axis from the clamping plane be minimized to reduce any residual torque that may be applied to the adjustable clamp by the lever arm. For example, pivot screw 70 in pivot support 62 may be lowered toward the clamping plane while making suitable adjustments to the lever arm and adjustable clamp to meet other requirements of the design as explained herein.

The novel tool may also be used with lever arm 72 mounted on pivot screw 70 about either one of the illustrated bearing surfaces 74 or 76. However, in the embodiment illustrated, lever arm 72 is actually mounted about bearing surface 74. This arrangement is designed to effect a "pinching" type force between cam extension 80 and projecting edges 56 of the adjustable clamp. The magnitude of the pinching type force is largely determined as a multiple of a force applied to handle 78 times a ratio of (a) a distance between cam extension 80 and the force applied at the handle to (b) a distance between cam extension 80 and pivot screw 70. Since the first distance of this ratio is much larger than the second distance, it may be appreciated that the pinching type force between cam extension 80 and projecting edges 56 is increased by a mechanical advantage over any force applied to handle 78.

The alternative mounting position of lever arm 72 on pivot screw 70 about bearing surface 76 would benefit from a similar advantage. That is, although bearing surface 76 is located between pivot screw 70 and cam extension 80, the same definition of mechanical advantage as that explained for the illustrated embodiment applies to the alternative mounting position. However, a force applied to handle 78 may be understood to effect a "prying" type force between projecting edges 56 and cam extension 80 that is increased by mechanical advantage over the force applied to handle 78.

Regardless of whichever bearing surface 74 or 76 is used to mount lever arm 72 to adjustable clamp 42, an appropriate force applied to handle 78 is intended to have the result of freeing a retracted locking collar and restoring it to its original position. However, the force applied to handle 78 which is required to accomplish this result must be applied in opposite directions between the two mounting positions. For instance, when lever arm 72 is mounted about bearing surface 74, as particularly illustrated by FIG. 3, the required force applied to handle 78 should be in a direction toward the clamping plane which pivots the lever arm in the direction of arrow 82. Conversely, when lever arm 72 is mounted about bearing surface 76, the force applied to handle 78 should be in a direction away from the clamping plane.

Figure 8:
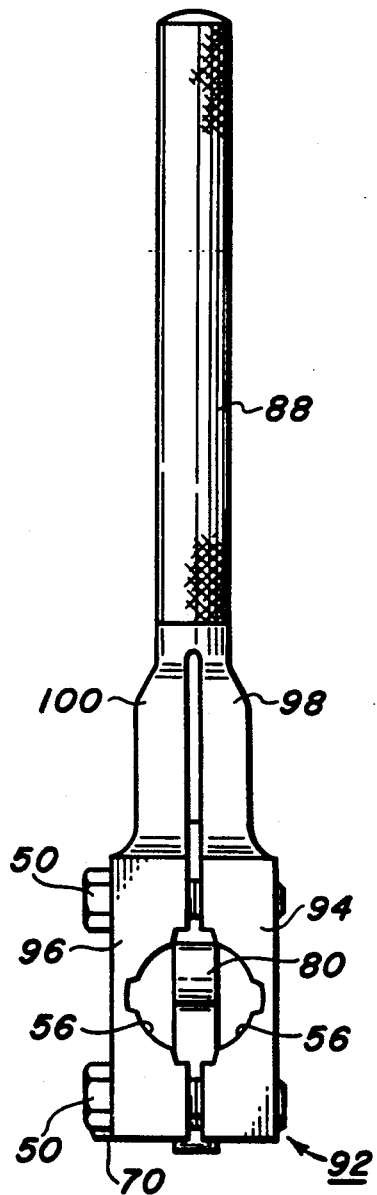
FIG. 8 is a bottom elevational view of the adjustable clamp portion of an alternatively configured novel tool having a second handle.
Figure 9:
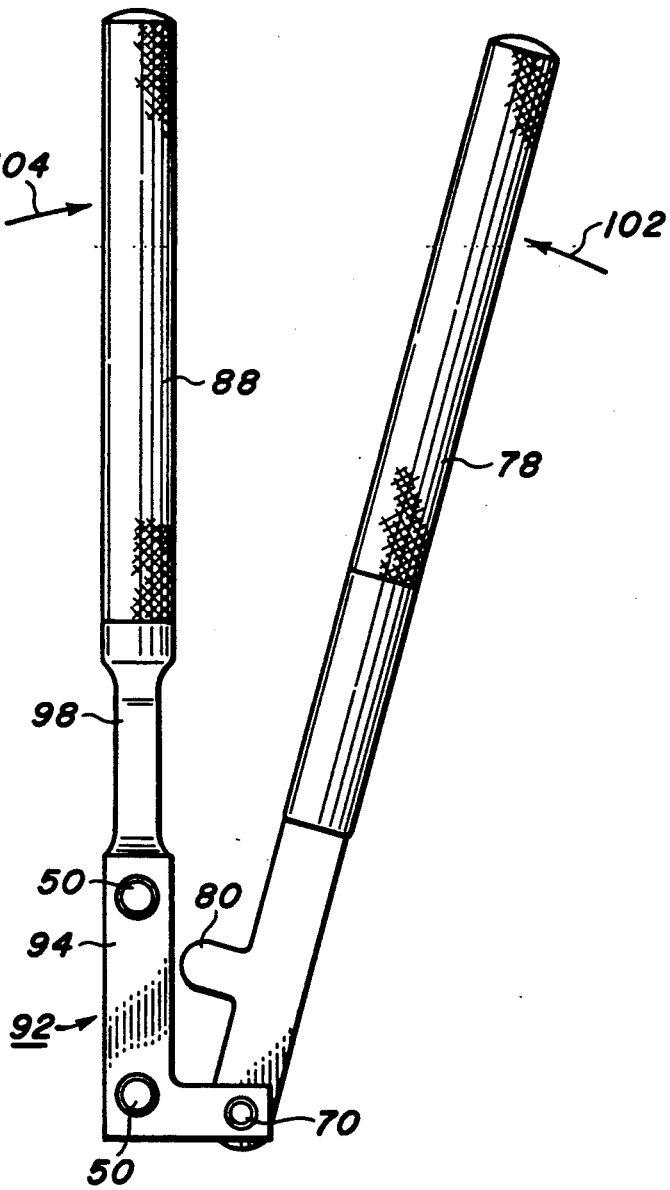
FIG. 9 is a side elevational view of the novel alternatively configured tool.

An alternative embodiment is illustrated by FIGS. 8 and 9. The embodiment includes many of the same features as the embodiment illustrated in the preceding figures and the same reference numerals are used to identify these features. The most important difference of the new embodiment is the addition of handle 88 which is formed integrally with respective jaw portions 94 and 96 of adjustable clamp 92.

It is important to note that in advance of its juncture with respective jaw portions 94 and 96, handle 88 separates into two arms 98 and 100 that are spaced apart a sufficient distance to urge a separation between the respective jaw portions while permitting the jaw portions to be closed by screws 50. Thus, handle 88 may also be understood to function as a spring which opens respective jaw portions 94 and 96 a sufficient amount so that projecting edges 56 may fit over end rim 40 of locking collar 32. However, the spring force of handle 88 may be overcome by screws 50 to permit projecting edges 5 to securely grip the peripheral surface of locking collar 32 beneath end rim 40.

In further contrast to the first illustrated embodiment, a "gripping" type force may be applied to both handle 78 and handle 88 in the respective directions of arrows 102 and 104. The additional force applied to handle 88 augments the force applied to handle 78 for raising a retracted locking collar while virtually eliminating any residual torque applied to locking collar 32 that might tend to cock the locking collar within its chamber in the slack adjuster.

It is also contemplated that handle 88 may be made detachable from the respective jaw portions 94 and 96 by providing threaded connections thereto. Although eliminating the spring function of handle 88, it would be possible to attach the handle to only one of the jaw portions 94 or 96 to permit the tool to be assembled much more quickly.

The novel method for adjusting brake backlash in accordance with the present invention includes a number of new procedures that are made possible by the novel tool of the present invention. The new procedures provide for restoring locking collars to their original positions, particularly when such locking collars become stuck in retracted positions.

In particular, the novel method provides for mounting adjustable clamp 42, 92 on a peripheral surface of locking collar 32 so that projecting edges 56 of opposing jaw portions 44, 94 and 46, 96 of the adjustable clamp fit beneath end rim 40 of the locking collar. With the adjustable clamp so mounted, the locking collar may be forcefully retracted to expose head portion 30 of adjusting screw 24. A backlash adjustment is made in the usual way by turning adjusting screw 24 to a desired position.

Lever arm 72 is mounted on pivot support 62 so that cam extension 80 contacts head portion 30 of the adjustment screw. A force is then applied to handle 78 (or in the alternative to handles 78 and 88) to exert a drawing force between cam extension 80 and projecting edges 56 to forcefully restore the locking collar to its original position. Once the locking collar is appropriately restored, adjustable clamp 42, 92 may be removed from the locking collar and the brake adjustment is complete.

The novel method also contemplates a number of other features that are related to specific structural attributes of the tool. For example, the step of mounting adjustable clamp 42, 92 may include orienting the adjustable clamp with respect to locking collar 32 so that one of a plurality of clearance openings 60 formed between projecting edges 56 is aligned with key 36 of the locking collar. This feature provides for orienting the novel tool with respect to the locking collar so that the tool may be used in the most appropriate working area around the brake mechanism.

In addition, the steps of mounting and removing adjustable clamp 42, 92 may include adjusting the spacing between jaw portions 44, 94 and 46, 96 so that projecting edges 56 may be fit over end rim 40 of the locking collar. This may be accomplished with adjustable clamp 92 by merely backing off screws 50 and allowing arms 98 and 100 to appropriately separate jaw portions 94 and 96. Similarly, screws 50 may be used to tighten jaw portions 44, 94 and 46, 96 so that projecting edges 56 tightly grip the peripheral surface of the locking collar.

The step of mounting lever arm 72 may be further characterized by mounting lever arm 72 on pivot screw 70 about either one of bearing surfaces 74 and 76. However, if lever arm 72 is mounted about bearing surface 74, a component of the force applied to handle 78 is in a direction toward the clamping plane defined by projecting edges 56. Alternatively, if lever arm 72 is mounted about bearing surface 76, a component of the force applied to handle 78 is directed away from the clamping plane. In either case, a resulting force between cam extension 80 and projecting edges 56 is increased by a mechanical advantage over the force applied to handle 78.

Furthermore, the step of applying a force to handle 78 may also include applying an opposing force to handle 88. Together, the two opposing forces define a "gripping" force between the handles that effects a drawing force between cam extension 80 and projecting edges 56 to restore the retracted locking collar to its original position.

Although the invention has been described with respect to a limited number of illustrated embodiments, it may be appreciated that other variations are possible within the scope of the invention as set forth in the appended claims.

I claim:

1. A tool for restoring retracted locking collars for brake adjusting screws to their original positions comprising:
   an adjustable clamp having jaw portions for gripping a peripheral surface of the locking collar;
   each jaw portion forming a load bearing surface against an end rim of the locking collar;
   means for adjusting spacing between said jaw portions for releasably securing said adjustable clamp to the locking collar;
   a pivot support mounted on a top surface of said adjustable clamp defining a pivot axis;
   a lever arm mounted about said pivot axis having a handle formed at one end and a cam extension located along said lever arm in a position that may be pivoted into contact with a head portion of the adjusting screw; and
   said load bearing surfaces being defined by projecting edges formed adjacent to a bottom surface of said adjustable clamp.

2. The tool of claim 1 wherein said projecting edges define at least one clearance opening for a key portion of the locking collar.

3. The tool of claim 2 wherein a plurality of said clearance openings are provided for orienting said adjustable clamp with respect to the key portion in any one of four quadrants about the locking collar.

4. The tool of claim 1 wherein said projecting edges adjacent to said bottom surface of said adjustable clamp define a clamping plane, said pivot axis being oriented substantially parallel to said clamping plane.

5. The tool of claim 4 wherein said cam extension is located along said lever arm between said handle and said pivot axis.

6. The tool of claim 5 wherein a force applied to said handle in a direction toward said clamping plane produces a drawing type force between said cam extension and said projecting edges that is increased by a mechanical advantage over said force applied to said handle.

7. The tool of claim 4 wherein said pivot axis is located between said cam extension and said handle.

8. The tool of claim 7 wherein a force applied to said handle in a direction away from said clamping plane produces a drawing type force between said cam extension and said projecting edges that is increased by a mechanical advantage over said force applied to said handle.

9. The tool of claim 4 wherein said cam extension is located at a sufficient distance from said pivot axis to provide for an amount of travel of said cam extension about said pivot axis in a direction perpendicular to said clamping plane corresponding to an amount of travel of the locking collar between original and retracted positions.

10. The tool of claim 1 wherein said pivot support includes a pair of parallel columns mounted respectively on said jaw portions and a pivot screw extending between said columns defining said pivot axis.

11. The tool of claim 10 wherein said lever arm is detachably mounted on said pivot screw about a bearing surface formed in said lever arm.

12. The tool of claim 11 wherein said cam extension is located between said handle and said bearing surface.

13. The tool of claim 1 wherein a clearance opening is defined between said jaw portions in said top surface of said adjustable clamp for permitting access to the end rim of the locking collar and the head portion of the adjusting screw.

14. The tool of claim 1 wherein a second handle is attached directly to said adjustable clamp.

15. A tool for restoring retracted locking collars for brake adjusting screws to their original positions comprising:
   an adjustable clamp having jaw portions for gripping a peripheral surface of the locking collar;
   each jaw portion forming a load bearing surface against an end rim of the locking collar;
   means for adjusting spacing between said jaw portions for releasably securing said adjustable clamp to the locking collar;
   a pivot support mounted on said adjustable clamp defining a pivot axis;
   a lever arm mounted about said pivot axis having a handle formed at one end and a cam extension located along said lever arm in a position that may be pivoted into contact with a head portion of the adjusting screw;
   said pivot support including a pair of parallel columns mounted respectively on said jaw portions and a pivot screw extending between said columns defining said pivot axis;
   said lever arm being detachably mounted on said pivot screw about a bearing surface formed in said lever arm;
   said cam extension being located between said handle and said bearing surface; and
   a second bearing surface for mounting said lever arm on said pivot screw being located between said cam extension and said handle.

16. A tool for restoring retracted locking collars for brake adjusting screws to their original positions comprising:

an adjustable clamp having jaw portions for gripping a peripheral surface of the locking collar;

each jaw portion forming a load bearing surface against an end rim of the locking collar;

means for adjusting spacing between said jaw portions for releasably securing said adjustable clamp to the locking collar;

a pivot support mounted on said adjustable clamp defining a pivot axis;

a lever arm mounted about said pivot axis having a handle formed at one end and a cam extension located along said lever arm in a position that may be pivoted into contact with a head portion of the adjusting screw;

a second handle being attached directly to said adjustable clamp; and said second handle including a pair of arms that are attached to said respective jaw portions for exerting a separating force between said jaw portions through a sufficient distance to permit the adjustable clamp to be mounted over the end rim of the locking collar while permitting said means for adjusting spacing between said jaw portions to overcome said separating force for securing said adjustable clamp to the locking collar.

17. A tool for restoring retracted locking collars for brake adjusting screws to their original positions comprising:

an adjustable clamp having jaw portions for gripping a peripheral surface of the locking collar;

each jaw portion forming a load bearing surface against an end rim of the locking collar;

means for adjusting spacing between said jaw portions for releasably securing said adjustable clamp to the locking collar;

a pivot support mounted on said adjustable clamp defining a pivot axis;

a lever arm mounted about said pivot axis having a handle formed at one end and a cam extension located along said lever arm in a position that may be pivoted into contact with a head portion of the adjusting screw; and a second handle being attached to said adjustable clamp and being detachable from said adjustable clamp.

18. A method of adjusting backlash in brake mechanisms having a locking collar for protecting an adjusting screw comprising the steps of:

mounting an adjustable clamp on a peripheral surface of the locking collar so that load bearing surfaces of said adjustable clamp fit beneath an end rim of the locking collar;

retracting the locking collar to expose a head portion of the adjusting screw;

positioning a lever arm about a pivot support mounted on said adjustable clamp so that a cam extension of said lever arm contacts the head portion of the adjusting screw; and applying a force to a handle formed in said lever arm to produce a drawing force between said cam extension of said lever arm and said bearing surfaces of said adjustable clamp for restoring the locking collar to its original position.

19. The method of claim 18 wherein said drawing force is increased by a mechanical advantage over said force applied to said handle as substantially defined by a ratio of a distance between said cam extension and said force applied at said handle to a second distance between said cam extension and a pivot axis defined by said pivot support.

20. The method of claim 18 wherein said step of mounting the adjustable clamp includes orienting said adjustable clamp with respect to the locking collar so that a clearance space in said adjustable clamp is aligned with a key portion of the locking collar.

21. The method of claim 20 wherein said step of mounting the adjustable clamp further includes adjusting a spacing between opposing jaw portions of said clamp for gripping and releasing said locking collar.

22. The method of claim 18 wherein said step of positioning the lever arm includes mounting said lever arm about a bearing surface formed in said lever arm in a position such that said cam extension is located between said handle and said bearing surface of the lever arm.

23. The method of claim 18 wherein said step of positioning the lever arm includes mounting said lever arm about a bearing surface formed in said lever arm in a position located between said handle and said cam extension.

24. The method of claim 18 wherein said step of applying a force to a handle includes applying a second force to a second handle attached to said adjustable clamp in a substantially opposite direction to effect an overall gripping force between the handles.

25. The method of claim 24 wherein said step of mounting an adjustable clamp includes applying a tightening force between opposing jaw portions of said adjustable clamp to overcome a separating force applied to said jaw portions by said second handle and to contact a peripheral surface of the locking collar.

26. The method of claim 18 including the further step of removing said adjustable clamp from the locking collar by separating jaw portions of said adjustable clamp.

* * * * *